US007679491B2

(12) United States Patent
Costello et al.

(10) Patent No.: US 7,679,491 B2
(45) Date of Patent: Mar. 16, 2010

(54) VEHICLE START/STOP BUTTON STATUS FEEDBACK AND LIGHTING

(75) Inventors: John R. Costello, Rochester Hills, MI (US); James P. Brecht, Shelby Township, MI (US); Tejas B. Desai, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 418 days.

(21) Appl. No.: 11/692,262

(22) Filed: Mar. 28, 2007

(65) Prior Publication Data

US 2007/0252681 A1    Nov. 1, 2007

Related U.S. Application Data

(60) Provisional application No. 60/788,442, filed on Mar. 28, 2006, provisional application No. 60/789,826, filed on Apr. 5, 2006.

(51) Int. Cl.
*B60R 25/10* (2006.01)

(52) U.S. Cl. .................................. 340/426.3; 307/10.3

(58) Field of Classification Search .................. 340/5.2, 340/5.6, 5.8, 425.5, 426.3; 307/10.2–10.6
See application file for complete search history.

(56) References Cited

U.S. PATENT DOCUMENTS

2006/0113841 A1*  6/2006  Dornbach et al. .......... 307/10.3

FOREIGN PATENT DOCUMENTS

DE     102004024253 A1    1/2005
WO        2004028871 A3    4/2004

OTHER PUBLICATIONS

International Search Report and Written Opinion dated Sep. 17, 2007.

* cited by examiner

*Primary Examiner*—Jeffery Hofsass

(57) ABSTRACT

A keyless ignition system for a vehicle includes an electronic control unit (ECU) that communicates through a wireless link with a start/stop button. The start/stop button includes a plurality of lighting sources to selectively illuminate the start/stop button for communicating current state of a vehicle operating parameter. The lighting sources are powered by a wireless power generating device within the start/stop button.

18 Claims, 2 Drawing Sheets

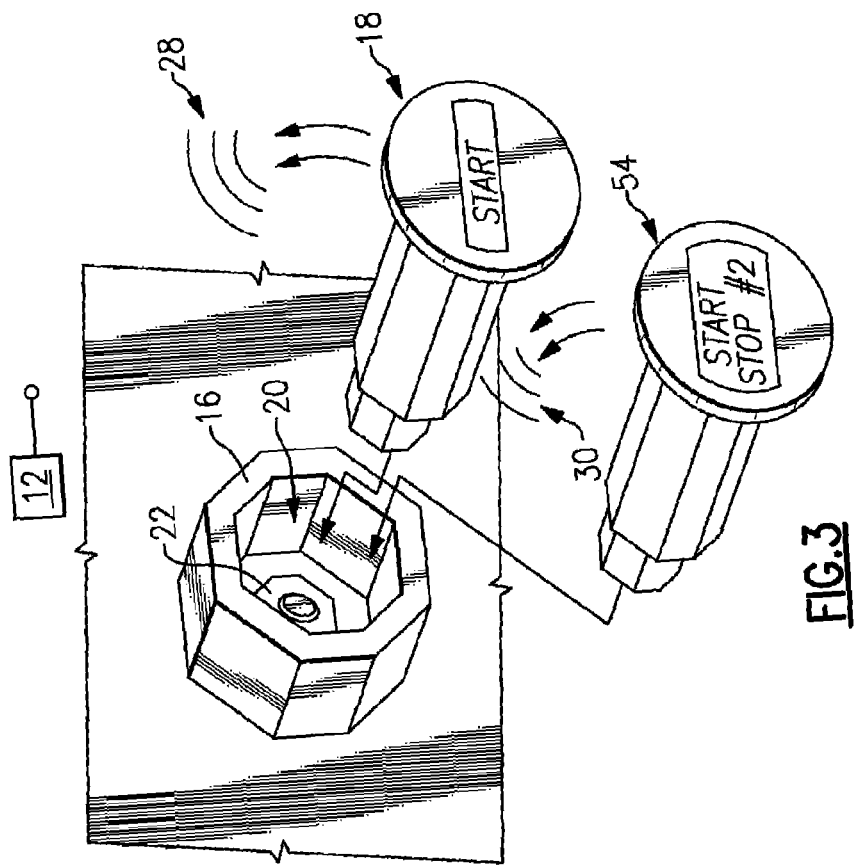
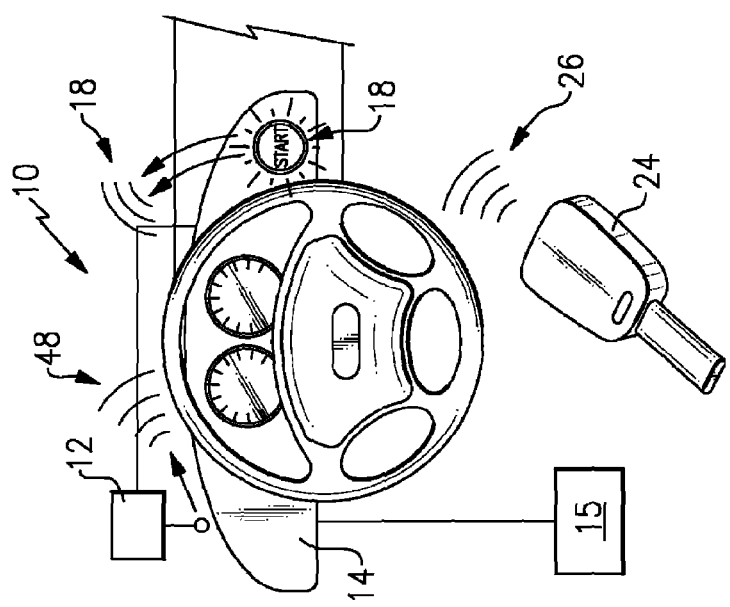

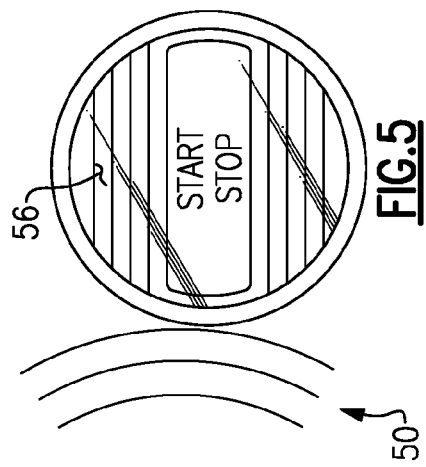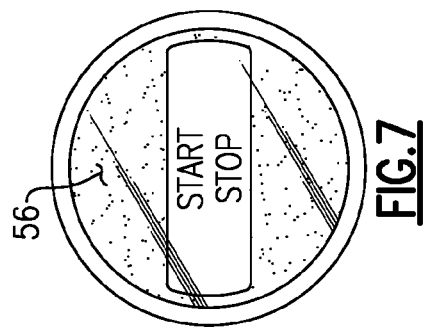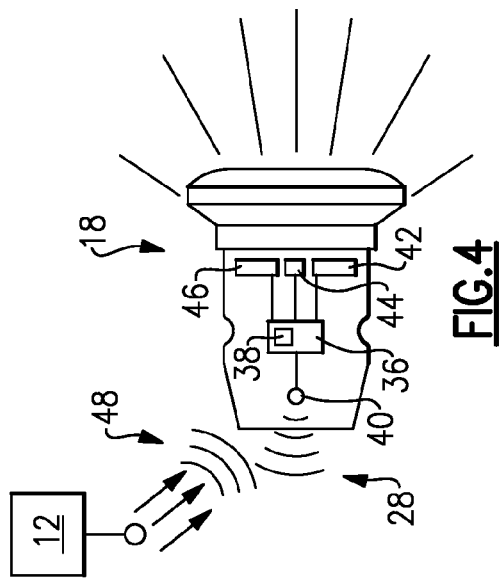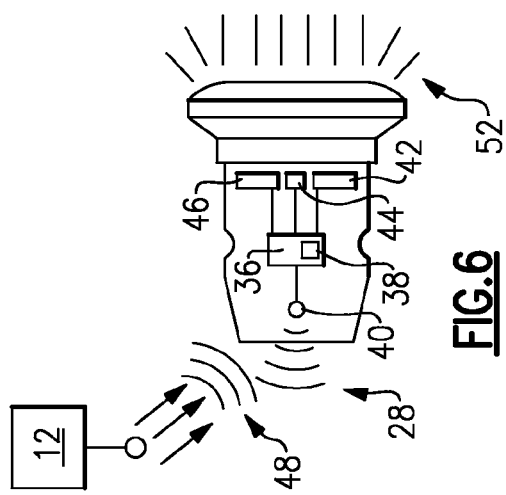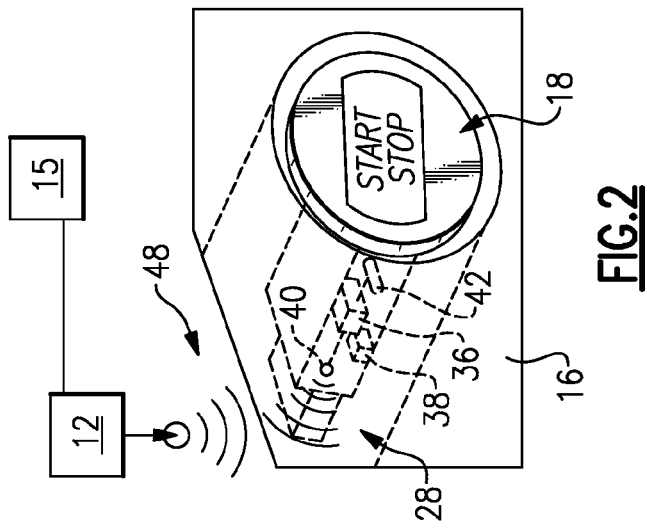

VEHICLE START/STOP BUTTON STATUS FEEDBACK AND LIGHTING

CROSS REFERENCE TO RELATED APPLICATION

This application claims priority to U.S. Provisional Application No. 60/788,442 which was filed on Mar. 28, 2006 and U.S. Provisional Application No. 60/789,826 filed on Apr. 5, 2006.

BACKGROUND OF THE INVENTION

This invention generally relates to a method and device for lighting a vehicle ignition start/stop button. More particularly, this invention relates to a method and device for selectively illuminating a removable vehicle ignition start/stop button.

A keyless ignition system for a motor vehicle utilizes a start/stop button instead of the commonly known ignition key lock mechanism. An electronic control unit within the vehicle receives an identification signal from a remote signaling device such as for example a key fob or a passive signaling device. The electronic control unit recognizes the identification signal and allows operation of the start/stop button in response to detecting an authorized identification signal. An operator then simply pushes the start/stop button to start or stop the vehicle.

Some start/stop buttons are removable to allow access to an alternate vehicle ignition mechanism. Such alternate vehicle ignition systems are utilized to provide a limp home mode in case of a failure of the authentication device. Further, such alternate vehicle ignition systems also include a valet mode that provides operation of limited vehicle features. These removable start/stop buttons are not internally illuminated and are simply a button that provides the mechanical interface with the starting mechanism.

SUMMARY OF THE INVENTION

A disclosed example start/stop button is removable and selectively illuminatable to communicate status information.

An example keyless ignition system for a vehicle includes an electronic control unit (ECU) that communicates through a wireless link with a start/stop button and an identification device. The example start/stop button includes a plurality of lighting sources to selectively illuminate the start/stop button and communicate a current state of the ignition system. The button further emits an identification signal that is utilized by the ECU to authorize operation. The button is removable to provide for alternate operation such as for example a limp home mode or a valet mode. The lighting sources and microcontroller are powered by an inductive resonance device that generates electric current responsive to receipt of a signal from the ECU.

Accordingly, the example start/stop button provides selective illumination and control of illumination without a wired connection. Further, the example start/stop button is removable to provide for the use of multiple buttons to customize operation and tailor desired vehicle operation.

These and other features of the present invention can be best understood from the following specification and drawings, the following of which is a brief description.

BRIEF DESCRIPTION OF THE DRAWINGS

FIG. 1 is a schematic view of an example vehicle instrument panel including an example start/stop button.

FIG. 2 is a schematic view of an example start/stop button within a support housing.

FIG. 3 is a schematic view of an example removable start/stop button.

FIG. 4 is a cross-sectional view of an example start/stop button in a first illuminated condition.

FIG. 5 is a front view of the example start/stop button in the first illuminated condition.

FIG. 6 is a cross-sectional view of the example start/stop button in a second illuminated condition.

FIG. 7 is a front view of the example start/stop button in the second illuminated condition.

DETAILED DESCRIPTION OF AN EXAMPLE EMBODIMENT

Referring to FIG. 1 and keyless ignition system 15 for a vehicle 10 includes an electronic control unit (ECU) 12 that communicates through a wireless link with a start/stop button 18 and an identification device 24. The identification device 24 emits an identification signal 26 that is received by the ECU 12. The ECU 12 verifies the identification signal 24 and enables the ignition system 15. The start/stop button 18 may then be depressed to actuate operation of the vehicle 10. The example start/stop button 18 includes a plurality of lighting sources to selectively illuminate the start/stop button 18 to communicate the current state of the ignition system 15. The button 18 further emits another identification signal 28 that is also verified by the ECU 15. The button 18 is removable to provide for alternate operation of the ignition system 15.

Referring to FIG. 2, the button 18 is schematically shown and includes a microcontroller 36, a transponder 38, a low frequency antenna 40 and a plurality of light emitting diodes (LED) 42, 44, 46. The microcontroller 36 receives signals 48 from the ECU 12 for controlling illumination of the LED's 42, 44, and 46. The example LED's 42, 44, 46 include different colors, for example green, red and white. Further, other combination of lights can be utilized to provide any desired illumination color scheme. The LED's 42, 44, and 46 are selectively illuminated to communicate the current function and state of the ignition system 15. For example, the LED's 42, 44, and 46 can include a green LED that when lit communicates that depressing the start/stop button 18 will start the vehicle. A red LED may be lit to indicate that depressing the start/stop button 18 will turn off the engine. A white LED may be lit in a flashing matter to indicate a fault in the ignition system. As appreciated, any number of colored lighting schemes are possible within the scope of this invention.

The LED's 42, 44, 46 and microcontroller 36 are preferably powered by an inductive resonance device or transponder 38 in this example that generates electric current responsive to receipt of the signal 48 from the ECU 12. A worker with the benefit would understand that many different wireless power generation devices can be utilized with the example start/stop button 18. The start/stop button 18 is therefore not hardwired to the vehicle 10. Movement of the start/stop button 18 physically engages an actuating mechanism 22 (FIG. 3); however the selective lighting scheme provided by the start/stop button 18 operates independent of power hard wired from the vehicle 10.

Referring to FIG. 3, the example start/stop button 18 communicates through a signal 28 with the vehicle ECU 12. The signal 28 communicates an identification code unique to the start/button 18 that is checked and verified by the ECU 12. The signal 28 verifies that the start/stop button 18 is authorized to operate the vehicle 10. This provides a check of the button 18 to prevent use of different start buttons to operate the vehicle 10. Further, a second start/stop button 54 may also be utilized to customize vehicle operations. In one example the second start/stop button 54 is utilized as a valet button that provides only limited operation of the vehicle. For example, with the second start/stop button 54 installed, a second signal 30 is communicated to the ECU 12. The ECU 12 identifies the second start/button 54 and limits operation based on desired protocol. For example, the vehicle speed may be limited, or operation of interior electronic components may be prevented. As appreciated, various start/stop buttons may invoke differing vehicle operational capabilities or settings.

Referring to FIGS. 4 and 5, the example start/stop button 18 is selectively illuminatable for communicating ignition system 15 status independent of wired connections to the vehicle 10. The button 18 comprises a housing that includes a transparent or translucent face 56. The LED's 42, 44, and 46 are controlled by the microcontroller 36 and powered by a transponder 38 or other resonance device that generates a current upon receipt of low frequency or other signal 48 from the ECU 12. Because the LED's 42, 44, 46 are powered by the example transponder 38, no hard wire is required to the button 18. Therefore, the example button 18 can be removable and selectively illuminated.

The example button 18 is schematically illustrated in a first illumination mode 50. In the first illumination mode 50, the button 18 is illuminated green to indicate that depressing the button 18 will begin the starting sequence. The intensity of the light can also be varied to match and correspond to current dashboard lighting. In other words, the example button 18 can selectively illuminated to correspond with a daylight or night time illumination scheme.

Referring to FIGS. 6 and 7 a second illumination scheme 52 is schematically illustrated to communicate that depressing the start/stop button 18 will stop the vehicle engine. In the second illumination scheme 52 a red one of the LED's 42, 44, and 46 is illuminated to emit the desired red light in response to commands sent by way of the signal 48 from the ECU 12.

As appreciated, other colors and combination of colors can be utilized to provide many different color schemes and modes to communicate various different information to a vehicle operator. Further, other colors can be generated with different colored LEDs or combinations of LEDs to provide a desired aesthetic appearance that compliments other interior lighting.

Accordingly, the example start/stop button provides selective illumination and control of illumination without a wired connection. Further, the example start/stop button is removable to provide for the use of multiple buttons to customize operation and tailor desired vehicle operation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A keyless ignition system comprising:
a support housing for a vehicle ignition system;
at least two start/stop buttons independently engageable with said support housing and movable between an actuated position and an inactive position within said support housing, wherein said at least two start/stop buttons each comprise a button housing;
at least one lighting device disposed within said button housing for selectively illuminating said at least two start/stop buttons; and
a transceiver in communication with a controller of the vehicle for receiving instructions utilized to control said at least one lighting device, wherein each of the at least two start/stop buttons includes an identification code communicated to the controller corresponding to different levels of vehicle operation authorization.

2. The keyless ignition system as recited in claim 1, including a transponder and antenna within said button housing for generating an electric current to light the at least one lighting device.

3. The keyless ignition system as recited in claim 2, wherein the transponder communicates with a controller of the vehicle to identify the start/stop button to the vehicle controller.

4. The keyless ignition system as recited in claim 1, wherein one of said at least two start/stop buttons includes an identification code corresponding with a limited vehicle operation mode.

5. The keyless ignition system as recited in claim 1, wherein said at least one lighting device comprises different illumination modes for communicating a status.

6. The keyless ignition system as recited in claim 1, wherein said at least one lighting device comprises at least two light emitting diodes each providing a different illumination color.

7. The keyless ignition system as recited in claim 6, wherein said at least two light emitting diodes are illuminated to a desired light level corresponding to an interior light level of the vehicle.

8. A keyless ignition system comprising:
a support housing defining an actuating mechanism communicating with an electronic control unit of a vehicle;
a primary start/stop button movable within said support housing for engaging said actuating mechanism including a primary controller including a transponder and an antenna for communicating a first identification code to the electronic control unit, wherein said primary start/stop button is removable from said support housing; and
a secondary start/stop button movable within said support housing for engaging said actuating mechanism including a secondary controller for communicating a second identification code to the electronic control unit, wherein the primary and secondary identification codes communicate different levels of authorized vehicle operation.

9. The system as recited in claim 8, including at light source within at least one of said primary start/stop button and said secondary start/stop button that is controlled by said microcontroller responsive to communication with said electronic control unit of the vehicle.

10. The system as recited in claim 8, wherein said microcontroller communicates one of the primary and secondary identification codes to the electronic control unit to identify said primary and secondary start/stop buttons.

11. The system as recited in claim 8, wherein said electronic control unit provides limited vehicle operation responsive to recognition of the secondary start/stop button being received within said support housing.

12. The system as recited in claim 8, including a plurality of selectively illuminated lighting sources within at least one of said primary and secondary start/stop buttons, wherein said plurality of lighting sources are controlled by said microcontroller.

13. The system as recited in claim 12, wherein said microcontroller illuminates said plurality of lighting sources to communicate a status to an operator.

14. A method of lighting a keyless ignition start button comprising the steps of:
- supporting a plurality of differently colored light sources within the start button;
- supporting a wireless power generating device within the start button for powering the plurality of differently colored light sources;
- communicating with a vehicle controller with a microprocessor supported within the start button though a wireless link to selectively illuminate the plurality of light sources;
- communicating with a vehicle controller with the microprocessor an identification code indicating a level of authorized vehicle operation; and
- illuminating a select combination of the differently colored light sources to communicate a current function state of the start button to a vehicle operator.

15. The method as recited in claim 14, wherein said microcontroller communicates the identification code to the vehicle controller for authorizing operation of vehicle functions, wherein more than one start button is adapted for communication with the vehicle controller each including a different identification code.

16. The method as recited in claim 14, including the step of illuminating the at least one light source in a first illumination mode to communicate a first vehicle condition, and illuminating the at least one light source in a second illumination mode to communicate a second vehicle condition.

17. A method of lighting a keyless ignition start button comprising the steps of:
- supporting at least one light source within the start button;
- supporting a wireless power generating device within the start button for powering the at least one light source;
- communicating with a vehicle controller with a microprocessor supported within the start button through a wireless link to selectively illuminate the at least one light source; adapting more than one keyless ignition start button for communication with the vehicle controller; and
- communicating between the vehicle controller and the microprocessor an identification code indicating a level of authorized vehicle operation; wherein at least one of the more than one start buttons includes an identification code indicating a reduced level of authorized vehicle operation.

18. The method as recited in claim 14, wherein said microcontroller communicates an identification code to the vehicle controller for authorizing operation of vehicle functions, wherein more than one start button is adapted for communication with the vehicle controller with each start button including a different identification code indicative of different level of authorized vehicle operation.

* * * * *